United States Patent
McQuarrie

[15] 3,636,498
[45] Jan. 18, 1972

[54] ADAPTER ASSEMBLY FOR MOUNTING A WATTHOUR METER AND LOCKING MEANS THEREFOR

[72] Inventor: Alexander M. McQuarrie, Rochester, N.H.
[73] Assignee: General Electric Company
[22] Filed: July 30, 1970
[21] Appl. No.: 59,429

[52] U.S. Cl. ...................339/39, 174/52 R, 220/3.8, 240/41.55, 292/281, 317/105, 339/198 M
[51] Int. Cl. ...................................................H02b 9/00
[58] Field of Search ...............317/104, 105, 107–111; 174/48, 50, 52; 220/3.8, 24; 324/74, 149; 292/283, 284, 256.69, 256.5; 339/31 R, 31 B, 31 M, 37, 39, 82, 44, 198 M, 176 R, 192 R, 192 RL, 64–66, 75 R, 75 M, 75 P

[56] References Cited

UNITED STATES PATENTS

| | | | |
|---|---|---|---|
| 3,422,260 | 1/1969 | Hedgewick | 240/41.55 |
| 3,221,216 | 11/1965 | Kobryner | 317/107 X |
| 1,834,779 | 12/1931 | Holmes | 317/105 X |
| 1,502,684 | 7/1924 | Ryan | 240/41.55 |

Primary Examiner—Marvin A. Champion
Assistant Examiner—Terrell P. Lewis
Attorney—Francis X. Doyle, Vale P. Myles, Frank L. Neuhauser, Oscar B. Waddell and Joseph B. Forman

[57] ABSTRACT

A unique locking means is provided for a watthour meter adapter assembly to prevent a three-wire meter from being removed from the assembly and inadvertently replaced with a two-wire meter which would not perform the desired metering function.

9 Claims, 6 Drawing Figures

PATENTED JAN 18 1972

Inventor,
Alexander M. McQuarrie,
by Vale P. Myles
His Attorney.

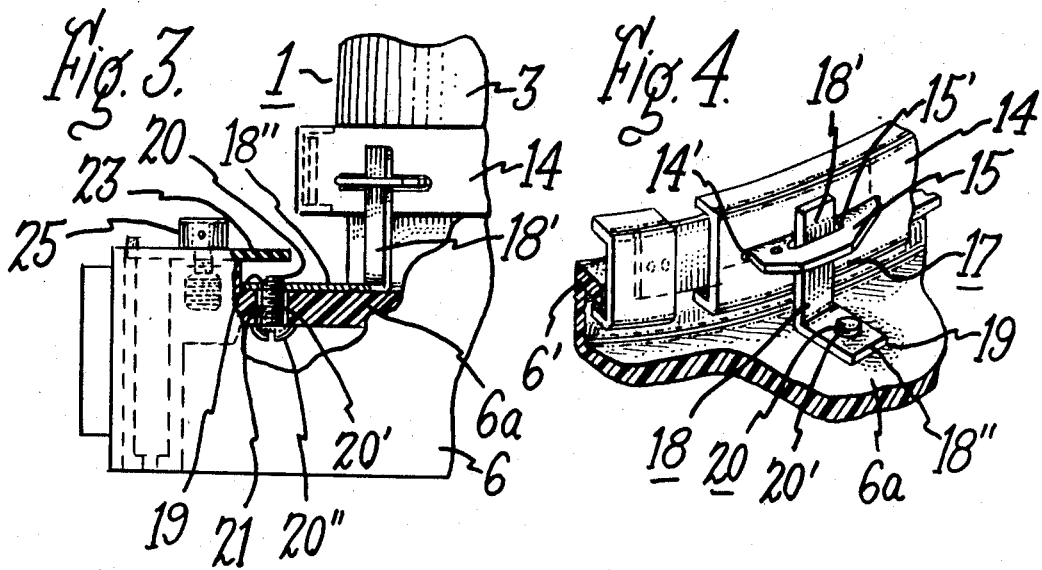
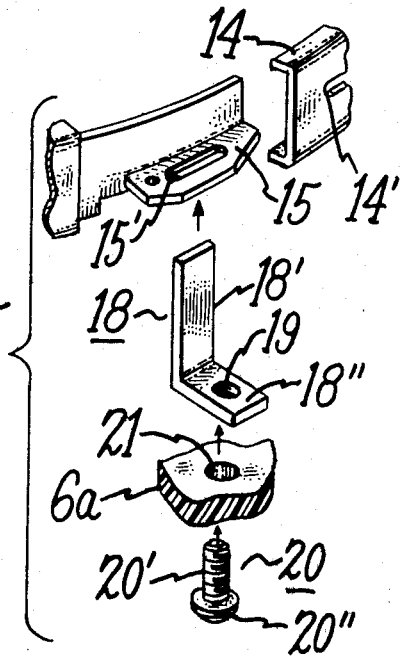
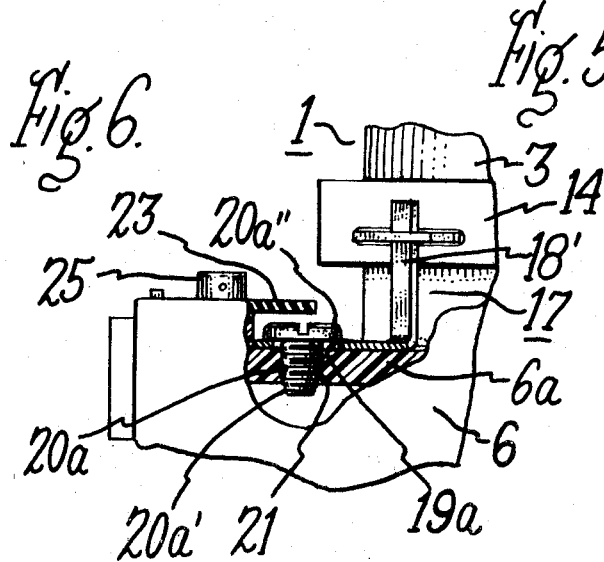
Inventor,
Alexander M. McQuarrie,
by Vale P. Myles
His Attorney.

ADAPTER ASSEMBLY FOR MOUNTING A WATTHOUR METER AND LOCKING MEANS THEREFOR

In the early history of metering electric power consumption, although some three-wire, bottom connected meters were used, the majority of service installations were metered by bottom connected, two-wire watthour meters. However, in recent years, the preponderance of new services has been of the three-wire type, which is metered by socket type three-wire watthour meters. As this transition was occurring, the socket-type watthour meter came into standard use in the industry. This created a problem with older systems because socket-type meters cannot be used to replace the older, obsolete bottom connected meters directly due to the different service wiring. In addition, meters designed for three-wire services are not usable directly for metering two-wire services.

Because of standardization and high volume production, socket-type three-wire meters have become less costly than two-wire, bottom connected meters. Also, modern socket-type meters are expected to have a usable life of 50 years or longer, whereas the need for two-wire bottom connected meters is expected to diminish as the older installations are taken out of service. Therefore, many electric utilities recognize that it is advantageous in the long term to purchase only the standard three-wire, socket-type meters.

Watthour meter adapter assemblies have been developed to enable a modern socket-type watthour meter to be used to replace an obsolete bottom connected watthour meter without requiring a change in the service wiring or the installation of a watthour meter socket. In addition, with a suitable adapter assembly, a modern three-wire watthour meter can be used to meter a two-wire service. Such an installation will generally be used for only a few years, after which the meter can be removed and placed in use on any modern three-wire service.

Such adapter assemblies have taken two general forms. In the first of these forms, an adapter assembly is provided in which lug means are used to manually connect the wires of a power distribution system to input terminals of the adapter, and additional lug means are provided for manually connecting terminals of a watthour meter to the adapter. A second, more conveniently usable, form of adapter has a plurality of manually adjustable lug-type terminals for connecting the adapter to a distribution system, but a watthour meter is connected to the adapter by simply plugging its bayonet contacts into jawlike contacts that are mounted in the adapter assembly and directly connected to the lug-type terminals. This latter type of watthour meter adapter assembly has the advantage of being efficient to use when it becomes desirable to replace a watthour meter, since it is only necessary to release a simple locking means on the adapter to enable the meter to be slipped out of contact with the jawlike resilient contacts of the adapter assembly. However, during use of this type of more convenient adapter assembly, a major disadvantage has been discovered; namely, a three-wire meter may be inadvertently replaced in the adapter by a two-wire meter, which would result in nonregistration of the meter. The chance of such a mistake occurring is compounded by the fact that operating personnel may not be aware that although the services are of the two-wire type, they are to be metered by a three-wire meter, with the necessary wiring conversions being taken care of by the in-place wiring of the adapter assembly.

A primary object of the present invention is to provide a watthour meter mounting arrangement that includes an adapter which has means for frustrating the inadvertent substitution of a two-wire watthour meter in an adapter assembly that contains circuitry that is connected to accommodate a three-wire meter.

Another object of the invention is to provide a watthour meter adapter assembly which is efficient to manufacture, yet rugged and readily operable, with a latching means that secures the adapter assembly against inadvertent substitution of a two-wire meter for a three-wire meter thereon.

A further object of the invention is to provide a watthour meter adapter assembly with locking means for holding a meter in place thereon, and with a simplified, but safely operable latching arrangement that must be released before the locking means can be opened to enable removal of the meter from the adapter assembly.

Still another object of the invention is to provide a watthour meter adapter assembly having a locking means for holding a meter to the assembly, and having a plurality of different latch mechanisms that are operable to prevent the locking means from being opened.

In one preferred embodiment of the invention, a watthour meter adapter assembly is provided with a ringlike clamping member having a lock thereon which is operable to hold the clamping member in a closed position in which it is effective to clamp a watthour meter base member to the adapter assembly. The adapter assembly also incorporates an L-shaped locking means that engages the lock on the ringlike clamping member to prevent its release. Finally, a latch mechanism is provided to hold the locking means on the adapter assembly in its locking mode until the latching mechanism is affirmatively operated to remove it from this holding position. In order to prevent inadvertent movement of the latching mechanism, a cover member is provided which extends over it and a set of lug-type terminals on the adapter assembly by which electric service is connected to the assembly. In an alternative embodiment of the invention, a second latching member is provided for preventing inadvertent movement of the locking means on the adapter assembly. This second latching member may be operated only after the adapter assembly is removed from its normal mounting in order to gain access to the second latching mechanism. In order to remove the adapter assembly from its normal mounting, the terminal cover 23 must be removed to afford access to assembly mounting screws. Thus, by requiring such removal of the adapter assembly which entails destroying a terminal cover seal, risk of inadvertent release of the second latching mechanism is substantially diminished.

Further objects and advantages of the invention and additional embodiments and modifications of it will be apparent to those skilled in the art when the invention is understood from a reading of the following description of it, taken in conjunction with the attached drawings, in which:

FIG. 3 is a fragmentary, side elevation view, partly in cross section, of an embodiment of the latching mechanism of the invention shown with respect to the adapter assembly and locking means illustrated in FIG. 2 of the drawing.

FIG. 4 is a perspective, fragmentary view of the latching mechanism shown in FIG. 3 of the drawing.

FIG. 5 is an exploded, fragmentary view, in perspective, of the latching mechanism shown in FIGS. 3 and 4.

FIG. 6 is a fragmentary, side elevation view, partly in cross section, of a second embodiment of the latching mechanism of the invention, shown with respect to the meter adapter assembly depicted in FIGS. 1–3.

Figure 1:
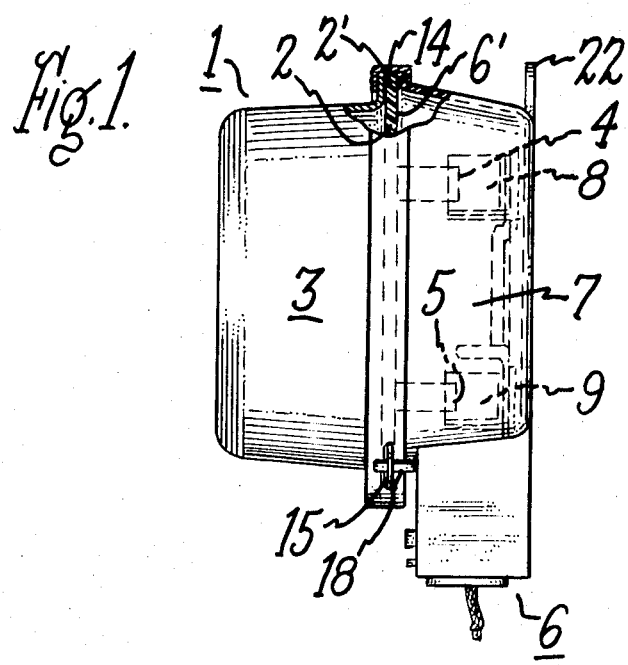
FIG. 1 is a side elevation view of a watthour meter mounted on a meter adapter assembly that includes a locking means and latching mechanism constructed pursuant to the present invention.

Referring now to FIG. 1 of the drawing, there is shown a watthour meter 1 that may be of any conventional type. The meter 1 has a meter base member 2 that is generally circular in outline and generally flat front and back sides. Mounted on the base member 2 is a metering mechanism (not shown) which may be of any conventional type, and surrounding this mechanism is a glass protective housing 3, which is mounted in sealed relationship on the base member 2 in any suitable manner well known in the watthour meter field. It will be appreciated that any standard materials and configurations other than those described herein may be used in forming the watthour meter 1, without impairing the present invention. In order to electrically connect the metering mechanism of watthour meter 1 to a circuit that is to be monitored by the meter, a plurality of bayonet contacts, two of which are shown as the contacts 4 and 5, are electrically connected in operating relationship with the metering mechanism and mounted through suitable apertures in the base member 2 so that they project outward therefrom, as illustrated in phantom in FIG. 1. Normally, four or five such bayonet contacts will be provided on watthour meters being used on today's commercial power distribution systems. With the embodiments of the invention illustrated herein, a four-jaw adapter is shown.

In order to facilitate an understanding of the present invention, it must be appreciated that the watthour meter 1 is a standard three-wire meter which, in the application to be described herein, is to be used in measuring power consumption on a two-wire system. Accordingly, a mechanical mounting and circuit adapting means must be provided to accommodate the meter 1 for such service. Toward that end, a meter-mounting adapter assembly 6 is provided. The assembly 6 comprises an insulating housing 7 that is molded from a suitable flame retarding, glass-filled polyester compound that has high impact resistance. A plurality of flexible jawlike contacts, two of which are illustrated as contacts 8 and 9, are mounted on the interior wall of housing 7 in any suitable manner. As is well known in the art, the jawlike contacts 8 and 9 are each adapted to receive one of the bayonet contacts 4 and 5, respectively, therein. In like manner, an additional pair of jawlike contacts 8 and 9' (see FIG. 2) will normally be mounted in the adapter assembly 6 to receive the additional pair of bayonet contacts protruding from the base member 2 of a conventional watthour meter, such as the meter 1.

Figure 2:
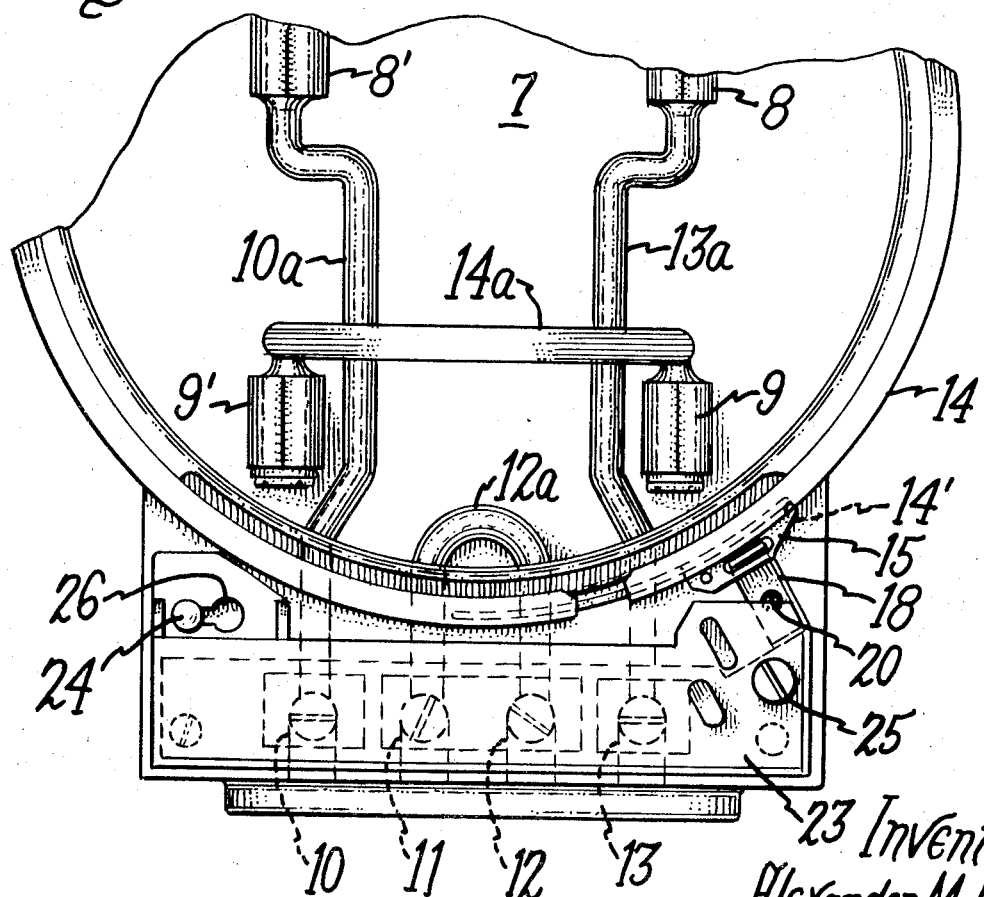
FIG. 2 is an enlarged, fragmentary front view of the adapter assembly shown in FIG. 1.

Since one of the primary functions of the adapter 6 is to provide means for connecting an electric circuit to the meter 1, it contains circuit means, partially shown in FIG. 2, that are electrically connected to form a conductive circuit between each of the jawlike contacts 8 and 9 (and another pair of such contacts, one of which is shown as 9') and a plurality of lug-type manually operable terminals 10, 11, 12 and 13. This circuitry may take any one of several conventional forms without departing from the present invention. In the embodiment shown in FIGS. 1 and 2, aluminum bus bars 10a, 11a, 12a and 13a are connected, as shown in FIG. 2, to form a circuit for connecting a three-wire meter to monitor two-wire service connected to lug-type "line" terminals 10–11 and "load" terminals 12–13, respectively. A generally annular member 14, that is substantially U-shaped in cross section, is provided for securing the meter base member 2 in a predetermined fixed position adjacent to the adapter assembly 6 so that the bayonet contacts 4 and 5 are held in engagement with the jawlike contacts 8 and 9 of the adapter assembly when meter 1 is mounted in operating position on assembly 6. In this embodiment of the invention the generally annular member 14 is made of stainless steel but other suitable materials may be used, it only being important that this member is sufficiently strong to afford the desired holding function while also being flexible enough to allow its expansion to release the meter 1 from the adapter assembly 6. Adjacent one end of the annular member 14 means are provided defining an aperture 14' (best seen in FIGS. 4 and 5) through it. Adjacent the other end of the annular member 14, a projecting member 15 is mounted on the annular member and is positioned to be slidably inserted through the aperture 14' when the annular member 14 is in its operating position. Thus, when the projecting member 15 is inserted through the aperture 14' as seen in FIGS. 1, 2 and 4, it prevents the meter 1 from being removed from its operating position on adapter assembly 6, since the respective legs of the U-shaped annular member 14 extend around and retain the base member 2 and an annular lip 6' on adapter assembly 6 in sealing relationship.

In order to retain the generally annular member 14 in its operating position, a locking means 17 comprising a generally L-shaped member 18 and means defining an aperture 15' in the projecting portion 15 on member 14 is provided to secure the member 14 in its operating position. As is perhaps best seen in FIGS. 3 and 4, the generally L-shaped member 18 has one relatively long leg that forms a rigid shaft portion 18' while its other leg 18" includes means defining a threaded aperture 19 therethrough. (Also see FIG. 5). Pursuant to the present invention, a latch mechanism 20 is provided to hold the locking means 17 in its locking mode when the respective parts are assembled in their operating position, as shown in FIGS. 1–4 of the drawing. The latching mechanism comprises a first screw member having a threaded shank portion 20' and a head portion 20". The shank portion 20' is adapted to pass through an aperture 21 formed by suitable means in a molded wall 6a of the adapter assembly 6. In this embodiment of the invention the diameter of aperture 21 is sufficiently large to enable the threaded shank portion 20' of the screw member 20 to be rotated through it into threaded engagement with the aperture 19 in L-shaped member 18, without engaging the sidewalls of the aperture 21.

In the operation of this embodiment of the invention, in order to mount a meter, such as watthour meter 1 on the adapter assembly 6, it is necessary to release the locking means 17 so that the apertured projection 15 mounted on end of the annular member 14 may be passed through aperture 14' in the other end of annular member 14, thus enabling the member 14 to be radially expanded so that the annular flange 2' (shown in FIG. 1) on the meter base member can be removed from the U-shaped circumference of the generally annular member 14. It will be noted that in order to move the locking means 17 from its locking mode, it is necessary to release the latch mechanism 20. As can be seen with particular reference to FIG. 3 of the drawing, the notched head portion 20" of screw member 20 is accessible only from the rear side of the adapter assembly 6. Therefore, since the adapter assembly 6 is normally supported in a vertical position by a suitable hanger 22 (see FIG. 1), mounted on the backside thereof, so that the face of the meter 1 is directed outward from a wall on which the adapter assembly 6 is mounted, it is necessary to remove the adapter assembly 6 from its mounting to obtain access to the latch mechanism 20, so that it can be released. When such access has been obtained, the screw member 20 is manually rotated to release its engagement with L-shaped member 18, thereby freeing the generally rigid shank portion 18' thereof so that it can be removed from the aperture 15' in the projection 15 to free the aperture 14' from confinement adjacent the projection 15 on the other end of annular member 14. By requiring the removal of adapter assembly 6 from its normal position to enable the release of the locking means 17, the risk of inadvertently removing a three-wire meter from the adapter assembly 6 and replacing it with a two-wire meter is substantially diminished.

Now that one embodiment of the invention has been described, reference is made to FIG. 6 of the drawing in which a second embodiment of the invention is illustrated. In FIG. 6, the same reference numerals are used to indicate parts identical to those in FIGS. 1–5 of the drawing. Thus, there is shown a protective meter housing 3, mounted in operating position on an adapter assembly 6 to which it is secured by a generally annular member 14, in the manner described above with regard to the embodiment of the invention illustrated in FIGS. 1–5. In this second embodiment of the invention, the primary functional distinction with respect to the first embodiment of the invention is that a latching mechanism 20a is accessible from the front side of adapter assembly 6 and can be operated from this front side to release the locking means 17. Structurally, the latching mechanism 20a comprises a second screw member that may be a self-tapping screw, as illustrated in FIG. 6. The screw member 20a comprises a shank portion 20a' and a head portion 20a" that is notched in order to enable the screw member 20a to be forcefully rotated into threaded engagement with the walls of an aperture 21 defined by suitable means in the portion 6a of molded polyester adapter 6. Of course, other suitable material may be used to manufacture the adapter 6. It will also be noted that the L-shaped member 18 of this embodiment of the invention has a larger aperture 19a in its shorter leg, than the aperture 19 illustrated in the L-shaped member of the first embodiment of the invention discussed above. The significance of this relative size differential between the apertures 19 and 19a will become apparent from the description of the invention that follows. However, before considering that distinction, it should be noted that in this embodiment of the invention a suitably shaped cover member 23, also seen in FIG. 2 of the drawing, is provided to form a protective insulating covering over the lug-type terminals 10-13 and also to restrict access to the second screw member 20a of the invention.

The cover member 23 may be formed of any suitable insulating material, but in this embodiment of the invention it is formed of a high-impact resistant, thermally moldable phenolic resin. Also, any suitable means might be used for securing the cover member 23 in operating position over the terminals 10-13; however, in this embodiment of the invention (as best seen in FIG. 2) the cover member 23 is secured to the adapter assembly 6 by the cooperative holding action of a flanged stud 24 embedded in assembly 6 and a screw 25, both of which hold the cover member 23 in operating position on the assembly 6. In order to release the cover member 23 from the assembly 6, it is necessary to rotate the screw 25 so that it can be moved out of engagement with a tapped bore in the adapter assembly 6, thereby freeing the cover member 23 so that it can be moved laterally to the left, (as seen in FIG. 2) thus bringing an aperture 26 in cover 23, under the head of stud 24 so that the stud 24 can be passed through it, and cover member 23 thereby be removed from the adapter assembly 6.

In the operation of this second embodiment of the invention, it will be apparent from the description just given of the method for removing cover member 23, taken in conjunction with the operation of the first embodiment of the invention, as discussed above, that in order to release locking means 17 so that generally annular member 14 can be expanded to enable watthour meter 1 to be removed from adapter assembly 6, it is necessary to first obtain access to the latching mechanism 20a. Such access can only be obtained by first removing cover member 23, thus the risk of inadvertently releasing locking means 18 is very substantially reduced with this second embodiment of the invention, as well as with the first embodiment of it, discussed above.

It will be noted by referring to FIGS. 3 and 6 of the drawing that the two embodiments of the invention are designed to cooperate in complimentary manner with one another, so that either embodiment of the invention can be used interchangeably with the adapter assembly 6. More specifically, it will be noted that the aperture 19a is at least as large as the aperture 19 illustrated in the embodiment of FIG. 3. Thus, if it is desired to replace the front-accessible latching mechanism 20a, illustrated in FIG. 6, with the rear-only accessibly latching mechanism 20, illustrated in FIG. 3, it is only necessary to remove screw member 20a and L-shaped member 18a (with its enlarged aperture in the short leg thereof) and substitute the L-shaped member 18 having a threaded aperture 19 in its shortest leg, while replacing the screw member 20a with the smaller diameter screw member 20 which is adapted to be threadably mounted in aperture 19, as shown in FIG. 3. Of course, the exactly reverse substitution can be made as well.

From the foregoing description of various embodiments of the invention, it will be apparent to those skilled in the art that further modifications and additional embodiments can be made without departing from the true scope and spirit of the invention. Therefore, the scope and spirit of my invention is defined in the following claims.

What I claim as new and desire to secure by Letters Patent of the United States is:

1. An adapter assembly for mounting a watthour meter having; a meter base member, a metering mechanism mounted on said base member, a protective housing mounted in sealed relationship on said base member and around said metering mechanism, and a plurality of bayonet contacts electrically connected in operating relationship to said metering mechanism, each of said contacts being mounted through said base member to project outward therefrom, said assembly comprising; a housing having a plurality of flexible jawlike contacts mounted thereon, each of said jawlike contacts being adapted to receive one of said bayonet contacts therein in electrically conducting relationship when a meter is mounted in operating position on said adapter assembly, a plurality of electrical terminals mounted on said adapter assembly for connecting an electric circuit thereto, circuit means electrically connected in to form a conductive circuit between selected terminals and at least two of said jawlike contacts, a generally annular member for securing a meter base member in a fixed position adjacent said adapter assembly thereby to hold said bayonet contacts in engagement with the jawlike contacts of the assembly, a cover member removably mounted on said adapter assembly over at least a portion of said terminals thereby to obstruct manual access to the terminals when the cover member is so mounted, locking means mounted on said adapter assembly for preventing removal of said generally annular member thereby to lock said meter base member in a fixed operating position adjacent the adapter assembly, a latch mechanism mounted adjacent said locking means, said latch mechanism being manually operable to selectively retain the locking means in its locking mode and to release it from said locking mode, said latch mechanism being mounted adjacent said cover member and rendered inoperative by it to release the locking means when the cover member is mounted in its obstructing position over said terminals, whereby said meter base member can be released from the generally annular member and removed from the adapter assembly only after the cover member is first removed from its operating position thereby to allow said latch mechanism to be operated to release the locking means.

2. An invention as defined in claim 1 wherein said generally annular member is U-shaped in cross section and adapted to have the respective legs of its U-shaped sides surround the peripheral edges of both said meter base member and said adapter assembly when the annular member is locked in its operating position, means defining an aperture in said annular member adjacent one end thereof, a projecting member mounted on said annular member adjacent the other end thereof, said projecting member being adapted to be slidably inserted through said aperture when the annular member is in its operating position thereby to prevent it from being removed from said operating position, and wherein said locking means comprises a relatively rigid shaft portion that is mounted to engage said projecting member thereby to lock it in said operating position when the locking means is latched in its locking mode.

3. An invention as defined in claim 2 wherein said projecting member includes means defining an aperture therein, said aperture being positioned to receive the rigid shaft member therein, thereby to lock the projecting member in said operating position.

4. An invention as defined in claim 3 wherein said locking means comprises a generally L-shaped member one leg of which comprises said relatively rigid shaft member and the other leg of which is retained in position by said latch mechanism when it is operated to retain the locking means in its locking mode.

5. An invention as defined in claim 4 wherein said other leg of the L-shaped member includes means defining an aperture through it, and said latch mechanism comprises means defining an aperture in said adapter assembly and a first screw member adapted to be rotatably inserted into threaded engagement with said aperture thereby to be secured in operating position on the adapter assembly, said screw member having a threaded shank portion and a head portion, said shank portion being adapted to pass through the aperture in said L-shaped member and said head portion being larger than said aperture, whereby the head portion of said screw member is operable to latch the locking means in its locking mode when the screw member is mounted in operating position in the threaded aperture in the adapter assembly.

6. An invention as defined in claim 5 including a second L-shaped member having substantially the same configuration as the first L-shaped member and having the aperture through its leg threaded, and including a second screw member having a threaded shank portion that is adapted to be threaded into the aperture in said second L-shaped member, said second screw member also comprising a head portion that is larger in cross section than the aperture through said adapter assembly, whereby the second screw member can be inserted through the aperture in said assembly into threaded engagement with the aperture in said second L-shaped member thereby to secure it in its locking mode when the first L-shaped member and the first screw member are removed from the adapter assembly and the second L-shaped member and second screw member are mounted, respectively, in their places.

7. An invention as defined in claim 6 wherein the shank portion of said second screw member is smaller in diameter than the inner diameter of the aperture in said adapter assembly, whereby the second screw member can be rotated in the said aperture through said assembly without engaging the walls thereof.

8. An invention as defined in claim 6 wherein said adapter assembly includes means defining an access passageway having its innermost end adjacent said second L-shaped member and having its outermost end on the side of said adapter assembly opposite to the side thereof on which said meter base member is mounted.

9. An adapter assembly for mounting a watthour meter comprising a housing having a plurality of jawlike contacts mounted thereon and adapted to receive bayonet contacts therein to form an electrical connection with a watthour meter provided with such bayonet contacts, a generally annular member for securing a watthour meter base member in a predetermined fixed operating position adjacent said adapter assembly thereby to hold a plurality of bayonet contacts mounted on the base member in engagement with the jawlike contacts of the assembly, locking means mounted on said adapter assembly for preventing movement of said generally annular member thereby to lock said meter base member in said fixed position, a latch mechanism mounted adjacent said locking means, said latch mechanism being manually operable to selectively retain the locking means in its locking mode and to release it from said locking mode, said latch mechanism being mounted on said assembly in an arrangement that restricts access to the latch means thereby to prevent the latch means from being operated while the assembly is in its normal operating position, whereby a meter base member can be released from the generally annular member only after the adapter assembly is first moved from its normal operating position to allow said latch mechanism to be operated to release the locking means.

* * * * *